United States Patent [19]

Fleury

[11] 4,003,446

[45] Jan. 18, 1977

[54] SERVO-STEERING CONTROL SYSTEMS FOR VEHICLES

[75] Inventor: Jacques Fleury, Paris, France

[73] Assignee: Societe Anonyme Automobiles Citroen, Paris, France

[22] Filed: May 9, 1975

[21] Appl. No.: 576,210

[30] Foreign Application Priority Data

May 16, 1974 France ............................ 74.017072

[52] U.S. Cl. ............................... 180/132; 91/368; 180/148
[51] Int. Cl.² ........................................... B62D 5/08
[58] Field of Search ............ 180/79, 2 R, 132, 148; 91/368, 369 R, 372, 373, 377, 378

[56] References Cited

UNITED STATES PATENTS

| 2,362,930 | 11/1944 | Robbins | 180/79.2 R |
| 2,827,123 | 3/1958 | Lincoln | 180/79.2 R |
| 3,100,550 | 8/1963 | Burt et al. | 180/79.2 R |
| 3,791,475 | 12/1974 | Cadiou | 180/79.2 R |

Primary Examiner—M. H. Wood, Jr.
Assistant Examiner—John A. Pekar
Attorney, Agent, or Firm—Brisebois & Kruger

[57] ABSTRACT

A servo-steering control for a vehicle comprising a jack adapted to operate the steering mechanism including a source of fluid under pressure to supply the jack which fluid is under the control of a slide valve which in turn is controlled by means responsive to the angular separation between a drive shaft and a shaft connected to the steering mechanism; the shafts being connected for limited relative rotation.

10 Claims, 5 Drawing Figures

SERVO-STEERING CONTROL SYSTEMS FOR VEHICLES

BACKGROUND OF THE INVENTION

The present invention relates to improvements in servo-steering control means for vehicles, of the type which comprise a jack intended to actuate the steering mechanism, a source of fluid under pressure for supplying the jack, a slide valve for distributing fluid under pressure to the jack, this slide valve being controlled by means sensitive to the angular separation between a drive shaft and a shaft connected to the steering mechanism, these two shafts being mechanically connected in rotation with a certain play.

In U.S. Pat. No. 3,791,475 filed Mar. 28, 1972 and granted Feb. 12, 1974, servo-steering control means are provided which consist principally of means for controlling the distributor slide valve comprising, on the one hand, two members rotatable about a common geometric axis, respectively connected in rotation, by drive means having the same ratio, one with the drive shaft, the other with the shaft coupled to the steering mechanism and, on the other hand, means connected to the distributing slide valve adapted to transform the angular separation of the rotary members into longitudinal movement of the slide valve.

It is generally recognised that to ensure operation with low friction of a servo-steering control means according to the aforementioned patent, and due to the fact of the manufacturing tolerances, the mechanical couplings between the various constituent elements of the servo-steering control mechanism are inevitably effected with a certain play. This play has the drawback of causing a slight lag in the driving of the distributing slide valve when the direction of the angular movement of the drive shaft reverses with respect to that of the shaft connected to the steering mechanism.

A first object of the invention is to improve further the sensitivity, precision, and fidelity of power steering apparatus of this type.

A second object of the invention is to provide servo-steering control means of the above-defined type which overcome the above-mentioned drawback.

Another object of the invention is to provide servo-steering control means ensuring constant take-up of any play occurring in the kinematic linkages comprised between the distributing slide valve and respectively the drive shaft and the shaft connected to the steering mechanism.

SUMMARY OF THE INVENTION

According to the invention a servo-steering control means of the previously defined type is essentially characterised by the fact that is comprises first elastic means adapted to cooperate with the slide valve and to exert an axial force on this slide valve and second elastic means arranged between the drive shaft and the shaft connected to the steering mechanism, adapted to resist the relative angular displacement between the two shafts which tends to cause the axial force exerted on the slide valve by the first elastic means, the setting of the first and second elastic means being such that the equilibrium of the slide valve in its middle position, such that the jack is not actuated, is obtained when the angular separation between the two shafts is substantially nil.

By angular separation between the two shafts, is meant the angular separation with respect to the relative mean position of the two shafts between their two relative extreme positions determined by the play of their mechanical linkage.

Generally, the first elastic means exert an axial thrust on the slide valve towards the means adapted to transform the angular separation of the rotary members into a longitudinal movement.

Preferably, these first elastic means are constituted by a spring compressed between the end of the slide valve distant from the abovesaid means adapted to transform the angular separation of the rotary members into longitudinal movement and a part of the housing surrounding the slide valve, the abovesaid spring being supported notably through a cap against the end of the slide valve.

According to another characteristic of the invention, the shafts being coaxial, the second elastic means comprise at least one flexible rod or strip substantially parallel to the common axis of the two shafts and connected respectively to each shaft; preferably one of the ends of this rod is anchored in one of the shafts or in a part fast to this shaft, whilst the other end of the rod is supported simply against a radial surface of the other shaft, or of a part fast to this other shaft. Generally this other end of the rod is engaged in a cavity whose dimensions taken in a plane perpendicular to the axis of the shafts are greater than those of the perpendicular cross-section of the rod.

Preferably, two flexible rods diametrically opposite with respect to the common axis of the two shafts are provided.

According to another feature of the invention, the shafts being coaxial, the second elastic means are constituted by a spring in the form of a C-shaped open ring, whose ends are supported, respectively against a radial surface of the drive shaft and against a radial surface of the shaft connected to the steering mechanism or against the radial surface of parts fast in rotation with these shafts.

BRIEF DESCRIPTION OF THE DRAWINGS

In order that the invention may be more clearly understood, reference is now made to the accompanying drawings showing preferred embodiments of the invention, purely by way of example. In the drawings:

FIG. 5, lastly, is a partial view from the left in elevation and in cross-section of a detail of FIG. 2.

DESCRIPTION OF SPECIFIC EMBODIMENTS

Figure 1:
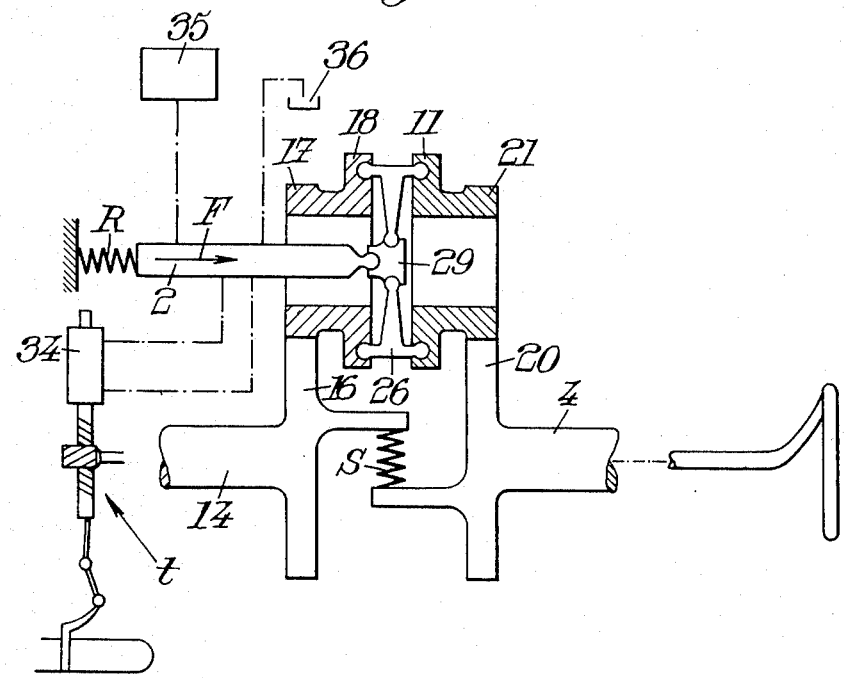
FIG. 1 shows diagrammatically one embodiment of a servo-steering control means according to the invention.
Figure 2:
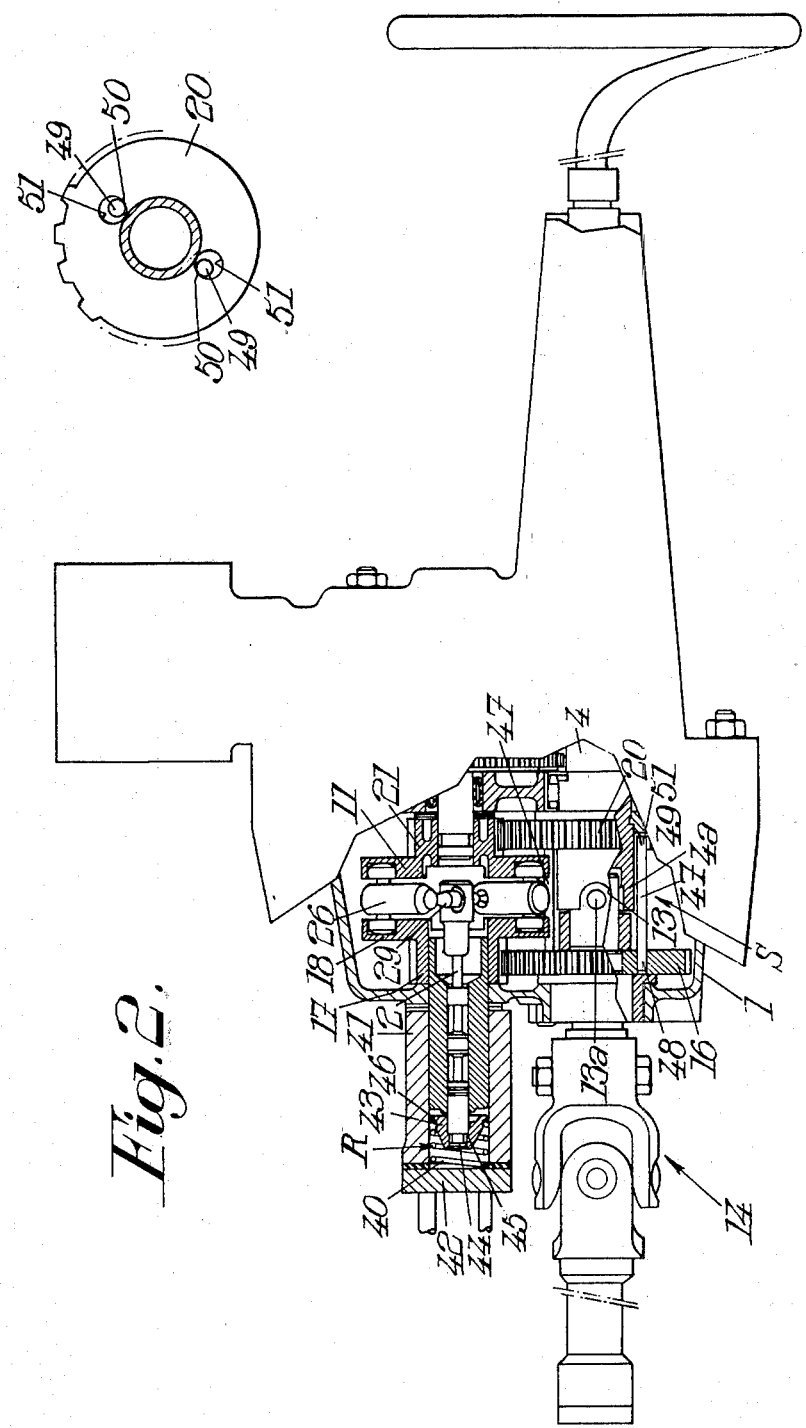
FIG. 2 shows in section with parts removed, elements of an embodiment of servo-steering control means with second elastic means according to the abovesaid characteristic.

The embodiment shown in FIG. 1 is a servo-steering control means for a vehicle, this servo-steering control being constructed according to the aforementioned patent. It comprises a jack 34 intended to actuate the steering mechanism t; a source of fluid under pressure 35 for supplying the jack, a fluid reservoir 36, and a slide valve 2 for the distribution of fluid under pressure to the jack 34. This slide valve 2 is controlled by means sensitive to the angular separation between a drive shaft 4 and a shaft 14, coaxial with shaft 4, connected to the steering mechanism. As seen in FIG. 2, the shaft 14 extends inside the housing 1, in extension of the shaft 4, the end of this shaft 14 being engaged in a sleeve 4a provided at the end of the shaft 4. This sleeve comprises indentations 13 (diametrically opposed) designed to cooperate with a pin 13a borne by the end of the shaft 14 and connected in rotation with the latter. The connection in rotation of the shafts 4, 14 ensured by the members 13, 13a, is effected with a certain angular play since the width of the indentations 13 is greater than the diameter of the pin 13a.

By angular separation between the two shafts 4, 14, is meant that with respect to the relative mean position of the two shafts between their two relative end positions determined by the play of their mechanical coupling. This angular separation is zero when the axis of the pin 13a occurs at the centre of the indentations 13.

The slide valve control means 2, sensitive to the angular separation between the shafts 4 and 14, comprise on the one hand, two members 18 rotatable around a common geometric axis, respectively connected in rotation, by drive means (pinions) 20, 21 and 16, 17 with the same ratio, the one with the drive shaft 4, the other with the shaft 14 and, on the other hand, means 26, 29 connected to the distributor slide valve, adapted to transform the angular separation of the rotary members 11, 18 into a longitudinal movement of the slide valve. The means 26 are notably constituted by T levers and the means 29 by a cross-bar with three ball-joint apices. The common geometric axis of the rotary members 11 and 18 is parallel to the geometric axis of the shafts 4 and 14, but different from this axis of the shafts 4 and 14. In fact, the axis of the members 11 and 18 is spaced from the axis of the shafts 4 and 14. For fuller details on these elements it will suffice to refer to the aforementioned U.S. Pat. No. 3,791,475.

To assist in better comprehension of the invention, the operation of the servo-steering control means will first of all be recounted briefly.

A relative displacement between the shafts 14 and 4, hence between the pinions 16 and 20 fast to the shafts, causes a relative angular displacement of the pinions 17 and 21, which enmesh respectively with the pinions 16 and 20, and hence of the rotary members 18 and 11, respectively fast to the pinions 17 and 21.

The levers or link-rods 26, by cooperating with the cross-bar 29, communicate a longitudinal movement to the slide valve 2, respective to the abovesaid angular displacement.

The supply of the jack 34 is then actuated in the appropriate direction, so that the angular displacement between the shafts 4 and 14 is restored towards the zero value.

It is an object of the invention to ensure the constant take-up of any play occuring in the kinematic linkages beteen the slide valve 2 and the pinion 16 fast to the shaft 14, and between the slide valve 2 and the pinion 20, fast to the shaft 4. For this purpose, first elastic means R adapted to cooperate with the slide valve 2 and to exert an axial force F on this slide valve and second elastic slide means S arranged between the drive shaft 4 and the shaft 14 connected to the steering mechanism, are provided. These second elastic means S are adapted to resist relative angular displacement between the two shafts 4 and 14 which tends to arise from the axial force exerted on this slide valve 2 by the first elastic means R. The setting of the first and second elastic means R and S is such that a balance of the slide valve 2 is obtained when the angular separation between the two shafts is substantially zero, that is to say when the key element 13a occurs substantially at the centre of the indentations 13 (FIG. 2).

The first elastic means R exert on the slide valve 2, preferably, an axial thrust towards the means 26, 29 adapted to transform the angular separation of the rotary members 11, 18 into a longitudinal movement of the slide valve. These first means R are advantageously constituted by a helical spring 40 (FIG. 2), compressed between the end of the slide valve 2 distant from the abovesaid means 26, 29 and a part of a housing 41 surrounding the slide valve 2. The part of this housing 41 serving as a support for the spring 40 is notably formed by the bottom 42 of this housing.

The spring 40 is supported against the end of the slide valve 2, preferably through a cap 43. This cap is traversed by a central bore 44 and includes a peripheral inner shoulder 45 adapted to come into abutment against an outer peripheral shoulder of the slide valve 2. The spring 40 surrounds the cap 43 and is supported against an outer shoulder 46 of this cap. A cylindrical outer bearing surface is provided in the vicinity of the shoulder 46 on the cap 43 to enable correct positioning of the spring 40.

As shown in FIG. 2, according to a first feature, the second elastic means S comprise at least one flexible rod or strip 47 parallel to the common axis of the shafts 4 and 14 and connected respectively to each of these shafts, or to pinions 20, 16 respectively fast to these shafts.

Preferably, two diametrically opposite rods 47 are provided.

Advantageously, one end 48 of each rod 47 is anchored in the pinion 16 fast to the shaft 14. This end 48 is thus fast to the pinion 16 and to the shaft 14 without possible relative movement between said end and said shaft.

The other end 49 of each rod 47 is supported simply against a radial surface 50 (FIG. 5), of the pinion 20 fast to the drive shaft 4. Preferably, the end 49 is housed in a cavity whose contour, situated in a plane perpendicular to the axis of the shafts, has dimensions greater than those of the perpendicular cross-section of the rod 47. The cavity is advantageously constituted by a circular hold 51 (if necessary blind) provided in the surface of the pinion 20 turned towards the pinion 16, this hole 51 having a diameter greater than that of the perpendicular cross-section of the rod 47. The radial surface 50 is constituted by an area of the wall of the hole 51 tangential to a diameter of the pinion 20.

Naturally, the reverse arrangement, according to which the end 49 would be anchored in the pinion 20, whilst the end 48 would be supported simply against a radial surface of the pinion 16, is also possible.

The end 49 is held constantly supported against the surface 50 due to the fact that the spring 40 which exerts a thrust on the slide valve 2 has a tendency to cause a relative angular displacement between the rotary members 18 and 11 and hence between the pinions 16 and 20 and the shafts 14 and 4. The one or more flexible rods 47 resist this relative angular displacement.

The calibration of the spring 40 and of the rods 47 is such that the balance of the slide valve 2, for which balance the slide rod occupies a neutral position actuating no movement of the piston of the jack 34, is obtained when the angular separation between the two shafts 4, 14 (or between the pinions 16 and 20 fast to these shafts) is substantially zero.

Figure 3:
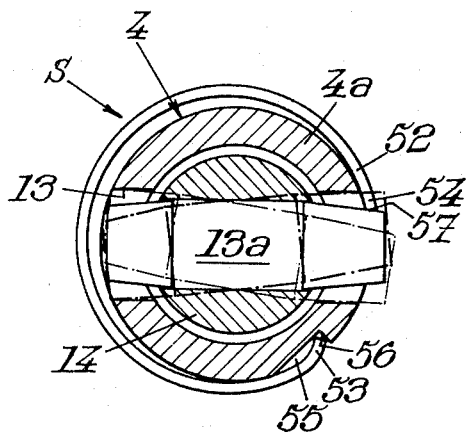
FIG. 3 is a section along the line III-III of FIG. 4, showing a second type of second elastic means for servo-steering control means according to the invention.
Figure 4:
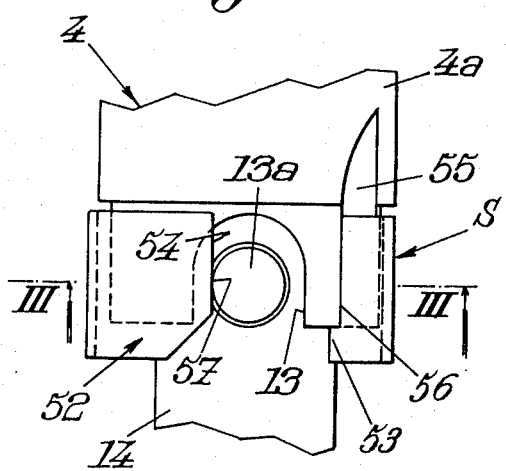
FIG. 4 is a view from the right with respect to FIG. 3, this right-hand view having undergone a rotation of 90°.

In the embodiment of FIGS. 3 and 4, the second elastic means S are constituted by a spring 52 in the form of an open circular ring. This spring 52 is therefore C-shaped. The ends 53, 54 of this spring are respectively supported on a radial surface of each of the shafts 4, 14 or of a part connected in rotation to these shafts.

According to an advantageous feature, the spring 52 is arranged axially at the level of the pin 13a which passes through the shaft 14 and which is connected in rotation to this shaft. The spring 52 is arranged around the sleeve 4a extending the shaft 4.

A recess 55 is provided at the end of the sleeve 4a, this recess including a radial surface 56 against which the inwardly curved end 53 of the spring 52 is supported.

The pin 13a projects into the diametrically opposite indentations 13 provided at the end of the sleeve 4a. The spring 52, through its other end 54, is supported against a radial surface 57 of the pin 13a. The position in solid line of the pin shown in FIG. 3 corresponds to zero angular separation between the shafts 14 and 4, whilst the other positions shown in mixed line correspond to maximum angular separation between the two shafts on each side of the position corresponding to zero separation. The spring 52 works essentially on opening or on closing, in flexion, and is adapted to resist angular displacement between the shafts 4 and 14 which the thrust of the spring 40 tends to cause. The setting of the springs 40 and 52 is such that the balance of the slide valve in its middle position so that the jack is not actuated, occurs for substantially zero angular separation of the shafts 4 and 14.

The general operation of the servo-steering control according to the invention is similar to that of the servo-steering control of the aforementioned patent and it will be sufficient to refer to this patent for operational details.

As regards more particularly the take-up means, according to the invention, of play existing in the kinematic linkages between the slide valve 2 and the shafts 4 and 14, the following comments may be offered.

Due to the fact of the axial force, notably of thrust exerted by the spring 40, the various elements of the kinematic linkages connected mechanically to one another, notably through ball joints or gearings, are held in constant contact against one another.

In the same way, the flexible rods 47 are held in constant contact with the surfaces 50 of the holes 51; in the case where the second elastic means are realized in the form of the spring 52 of FIGS. 3 and 4, the ends of the latter remain in constant contact with the surface 56 and with the surface 57 of the pin 13a.

When the drive shaft 4 rotates, with respect to the shaft 14, in the direction corresponding to that of the angular displacement that the axial force of the spring 40 tends to generate, the compression of the latter and the flexion of the second elastic means 47 or 52 become less than those existing when the angular separation between the shafts 4 and 14 is zero. Through this fact, notably in the case of FIG. 2, the force of application of the end 49 against the surface 50 will be weaker than when the angular separation is zero, but, however, the end 49 remains well in contact against the surface 50.

When the drive shaft 4 rotates in the direction opposite to that of the angular displacement which the spring 40 tends to generate, the compression of the latter and the flexion of the second elastic means are increased with respect to those which exist at equilibrium. Due to this fact, the force of application of the ends 49 against the surfaces 50 will be increased.

However in all cases, whatever the direction of rotation of the shaft 4, and notably on reversal of the direction of rotation of this shaft, all the elements of the kinematic linkages which have been previously discussed, remain in contact with one another (without play).

It may be noted that the play take-up device according to the present application, enables that forseen in the aforementioned patent, which only ensures the takeup of play of engagement between the pinions 16 and 17 and between the pinions 20 and 21, to be avoided. The play take-up device provided in this patent was ineffective at the level of the mechanical linkages between the levers 26 and the rotary member 18 and 11 and between the slide valve 2 and the cross-bar 29.

In addition, according to the invention, the play between the cross-bar 29 and the levers 26, is taken-up.

The slide valve 2 being spaced from the axes of the shafts 4 and 14, due to the interposition of the rotary members 11, 18, may be arranged in the most suitable position between the driving wheel and the steering mechanism t, in order to reduce the bulk and/or to facilitate accessibility and adaptation.

I claim:
1. A servo-steering control means for a vehicle comprising
   a jack operatively connected to operate a steering mechanism;
   a source of fluid under pressure in communication with the jack;
   a slide valve operatively connected to the sources of fluid to the jack to control the supply of said fluid under pressure to the jack, said slide valve controlled by means responsive to angular displacement between a driving shaft and a second shaft connected to the steering mechanism, said two shafts being mechanically connected through a lost motion connection permitting limited relative angular displacement between said shafts,
   the said means for controlling the slide valve including two rotary members rotatable about a common geometric axis and being respectively driven by drive means having the same ratio, one of said drive means connected to the driving shaft and the other to the second shaft, and means connected between said rotary members and said valve member to convert relative rotation between said rotary members into translational movement of said slide valve,
   said servo-steering control further including spring means operatively connected to the slide valve to exert an axial force on said slide valve, elastic means disposed between the drive shaft and said second shaft to resist relative angular displacement of said shafts, the tension of said spring means and elastic means being adapted to maintain the slide valve in a neutral position when the relative rotation between the two shafts is substantially zero.

2. Servo-steering control means according to claim 1, wherein said spring means is disposed to exert an axial thrust on the slide valve in a direction towards said means to convert relative rotation between said rotary members into translational movement of the slide valve.

3. Servo-steering control means according to claim 2, wherein the spring means is comprised of a compression spring compressed between the end of the slide valve distant from said means to convert relative rotation between said rotary membery into translational movement of said slide valve and a part of the casing surrounding the slide valve, said spring being supported against the end of the slide valve.

4. Servo-steering control means according to claim 3, wherein said spring is supported against the end of the slide valve through a cap.

5. Servo-steering control means according to claim 4, wherein the elastic means comprise two flexible rods diametrically opposite with respect to the axis of the shaft.

6. Servo-steering control means according to claim 1, wherein the two shafts are coaxial, and wherein the elastic means comprise at least one flexible rod substantially parallel to the common axis of the two shafts and coupled, respectively to each shaft.

7. Servo-steering control means according to claim 6, wherein one end of said rod is anchored in one of the shafts, the other end of the rod is supported against a radial surface of the other shaft.

8. Servo-steering control means according to claim 7, wherein the end of the rod supported against a radial surface of the said other shaft is disposed in a cavity whose dimensions in a plane perpendicular to the axis of the shafts are greater than those of the perpendicular cross-section of the rod, said cavity being provided in this shaft.

9. Servo-steering control means according to claim 1, wherein the elastic means includes a spring in the form of an open ring whose ends are supported, respectively, against a radial surface of the drive-shaft and against a radial surface of the shaft connected to the steering mechanism.

10. Servo-steering control means according to claim 9, wherein the open ring-shaped spring is disposed axially at the level of a pin passing through one of the shafts which pin is adapted to cooperate with indentations provided in a sleeve of the other shaft to provide a rotary connection between the two shafts, the ends of said spring being supported against the pin and against a radial surface of a recess provided in said sleeve.

* * * * *